(12) United States Patent
Tomita

(10) Patent No.: US 10,303,926 B2
(45) Date of Patent: May 28, 2019

(54) DECREASING LIGHTING-INDUCED FALSE FACIAL RECOGNITION

(71) Applicant: NEC Corporation, Mianto-ku, Tokyo (JP)

(72) Inventor: Yuusuke Tomita, Kawasaki (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/121,863

(22) Filed: Sep. 5, 2018

(65) Prior Publication Data

US 2019/0065828 A1     Feb. 28, 2019

Related U.S. Application Data

(63) Continuation of application No. 14/647,305, filed as application No. PCT/JP2013/081885 on Nov. 27, 2013, now Pat. No. 10,083,344.

(30) Foreign Application Priority Data

Nov. 28, 2012 (JP) ................. 2012-260049

(51) Int. Cl.
*G06K 9/00* (2006.01)
(52) U.S. Cl.
CPC ..... *G06K 9/00255* (2013.01); *G06K 9/00221* (2013.01); *G06K 9/00288* (2013.01)
(58) Field of Classification Search
CPC ............. G06K 9/0061; G06K 9/00221; G06K 9/00255; G06K 9/00288; G06T 2207/30201; H04N 5/23219; H04N 5/2352; H04N 5/2354
See application file for complete search history.

(56) References Cited

U.S. PATENT DOCUMENTS

| 9,082,235 B2 | 7/2015 | Lau et al. |
| 10,083,344 B2 | 9/2018 | Tomita |
| 2004/0091137 A1 | 5/2004 | Yoon ................. G06K 9/00268 382/118 |
| 2004/0119851 A1 | 6/2004 | Kaku |

(Continued)

FOREIGN PATENT DOCUMENTS

| CN | 1520161 A | 8/2004 |
| CN | 101661557 | 3/2010 |

(Continued)

OTHER PUBLICATIONS

U.S. Office Action for U.S. Appl. No. 16/106,192 dated Nov. 29, 2018.

(Continued)

*Primary Examiner* — Edward Park
*Assistant Examiner* — Michael J Vanchy, Jr.

(57) ABSTRACT

Photographing parameter(s) include a parameter(s) relating to exposure time and diaphragm, and is used upon capturing an image of a target. Before the image is obtained, lighting information is estimated based on the photographing parameter(s), and a number of feature points which is used upon facial recognition are determined based on the lighting information. The image is captured using the photographing parameter(s), and that performs, and facial recognition of the target is performed from the captured image using as many feature points as the determined number.

10 Claims, 8 Drawing Sheets

(56) References Cited

U.S. PATENT DOCUMENTS

| | | |
|---|---|---|
| 2005/0030415 A1 | 2/2005 | Takizawa |
| 2005/0117779 A1 | 6/2005 | Horie et al. |
| 2006/0127080 A1 | 6/2006 | Mori .................. G03B 7/08 396/121 |
| 2009/0060293 A1* | 3/2009 | Nagao ................ G06F 21/32 382/118 |
| 2009/0189998 A1 | 7/2009 | Nanu et al. |
| 2012/0293642 A1 | 11/2012 | Berini ................ G06F 21/32 348/77 |

FOREIGN PATENT DOCUMENTS

| | | |
|---|---|---|
| JP | 2005004718 A | 1/2005 |
| JP | 2005-157906 A | 6/2005 |
| JP | 2007-148968 A | 6/2007 |
| JP | 2007140823 A | 6/2007 |
| JP | 2008-015871 A | 1/2008 |
| JP | 2008-191743 A | 8/2008 |
| JP | 2008270896 A | 11/2008 |
| JP | 2009134593 A | 6/2009 |
| JP | 2012150730 A | 8/2012 |

OTHER PUBLICATIONS

International Search Report for PCT Application No. PCT/JP2013/081885, dated Jan. 7, 2014.

"Enhanced Local Texture Feature Sets for Face Recognition Under Difficult Lighting Conditions", Xiaoyang Tan and Bill Triggs, IEEE Transactions on Image Processing, vol. 19, No. 6, Jun. 2010, pp. 1635-1650.

Extended European Search Report for EP Application No. EP13858220.0 dated Sep. 16, 2016.

Chinese Office Action for CN Application No. 201380062218.3 dated Sep. 26, 2016 with English Translation.

Japanese Office Action for JP Application No. 2012-260049 dated Dec. 24, 2013 with English Translation.

Japanese Office Action for JP Application No. 2012-260049 dated Oct. 21, 2014 with English Translation.

US Office Action for U.S. Appl.No. 16/122,991 dated Jan. 4, 2019.

\* cited by examiner

FIG. 4

|  | ILLUMINANCE (LX) | FAR (%) |
|---|---|---|
| INDOOR / WITHOUT LIGHT | 1~100 | 5 |
| INDOOR / INCANDESCENT LAMP | 101~200 | 3 |
| INDOOR / FLUORESCENT LAMP | 2001~5000 | 1 |
| OUTDOOR / CLOUDY | 5001~9999 | 0.1 |
| OUTDOOR / BACKLIGHT | 10000~30000 | 1 |
| OUTDOOR / DIRECT LIGHT | 30001~60000 | 3 |
| ⋮ | ⋮ | ⋮ |

DECREASING LIGHTING-INDUCED FALSE FACIAL RECOGNITION

CROSS-REFERENCE TO RELATED APPLICATIONS

The present application is a continuation application of U.S. patent application Ser. No. 14/647,305 filed on May 26, 2015, which is a National Stage Entry of International Application PCT/JP2013/081885, filed on Nov. 27, 2013, which claims the benefit of priority from Japanese Patent Application 2012-260049, filed on Nov. 28, 2012, the disclosures of all of which are incorporated herein, in their entirety, by this reference.

TECHNICAL FIELD

The present invention relates to a facial recognition apparatus, a recognition method and a program therefor, and an information device.

BACKGROUND

In recent years, an identification by biological information such as a face, a fingerprint, an iris is used. Especially, since facial recognition can be recognized with non-contact, and gives little load to a user, use of the facial recognition is expected to increase.

In Patent Literature 1, there is disclosed a technique to select a best image of a face for a facial recognition, after capturing an image of the face of a person by using single camera with high resolution and a plurality of cameras with low resolution. Especially, in the technique disclosed in Patent Literature 1, a region of a face is detected from an input image with high resolution that is captured by the camera with high resolution, and brightness of the plurality of cameras with low resolution is controlled based on distribution of pixel values of the region of the detected face.
[Patent Literature 1]
Japanese Patent Kokai Publication No. 2009-134593A

SUMMARY

The disclosure of the above Patent Literature is incorporated herein by reference thereto. The following analysis has been given by the present invention.

When a facial recognition is performed, at first, it is desired to extract feature points (eyes, a nose, etc.) from an input image correctly. Further, when a facial recognition is performed, it is desired to extract a region of a face that is similar to an image of a face registered in a database.

Here, detection accuracy of feature points and recognition accuracy are different depending on lighting environment. For example, when an image of a face is captured indoors without light, the image of a face is not captured clearly, which may cause false detection of the feature points. And, when an image of a face is captured outdoors with sunlight, reflection of sunlight may cause false detection of the feature points.

In the technique disclosed in Patent Literature 1, decrease of detection accuracy and recognition accuracy of the feature points due to the lighting environment is not considered.

There is a need in the art to contribute to decreasing false recognition due to the lighting environment.

According to a first aspect, there is provided a facial recognition apparatus, comprising: a photographing parameter input unit that receives a photographing parameter(s); a lighting information estimation unit that estimates lighting information based on the photographing parameter(s); and a recognition accuracy control unit that controls a recognition accuracy parameter(s) based on the lighting information.

According to a second aspect, there is provided a recognition method, comprising: receiving a photographing parameter(s); estimating lighting information based on the photographing parameter(s); and controlling a recognition accuracy parameter(s) based on the lighting information.

According to a third aspect, there is provided a program causing a computer for controlling a facial recognition apparatus to execute: receiving a photographing parameter(s); estimating lighting information based on the photographing parameter(s); and controlling a recognition accuracy parameter(s) based on the lighting information.

This program can be recorded in a computer-readable non-transient storage medium. Namely, the present invention can be embodied as a computer program product.

According to a fourth aspect, there is provided an information device comprising a facial recognition apparatus, wherein the facial recognition apparatus comprises a photographing parameter input unit that receives a photographing parameter(s); a lighting information estimation unit that estimates lighting information based on the photographing parameter(s); and a recognition accuracy control unit that controls a recognition accuracy parameter(s) based on the lighting information According to each aspect of the present invention, a facial recognition apparatus, a recognition method and a program therefor, and an information device contributing to decreasing false recognition due to the lighting environment are provided.

BRIEF DESCRIPTION OF THE DRAWINGS

FIG. 4 is a drawing of an example of a table of showing a relationship between an illuminance and a FAR.

PREFERRED MODES

Figure 1A:
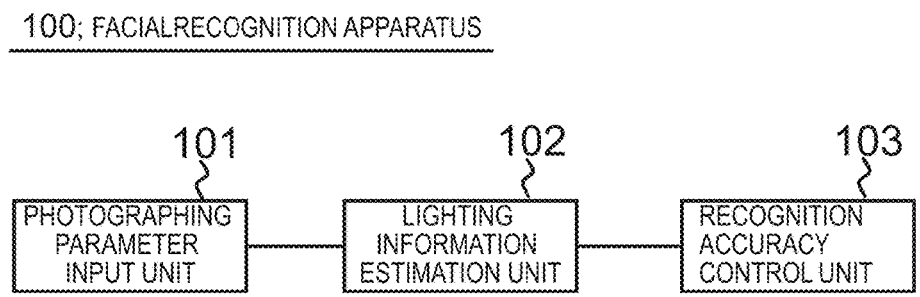
FIG. 1A and FIG. 1B are drawings for explaining an exemplary embodiment.

First, an outline of an exemplary embodiment of the present invention will be described with reference to the drawings. In the following outline, various components are denoted by reference characters for the sake of convenience. Namely, the following reference characters are merely used as examples to facilitate understanding of the present invention, not to limit the present invention to the illustrated modes.

As described above, when a facial recognition is performed, there is a case where an accuracy of the facial recognition decreases depending on lighting environment. Therefore, depending on the lighting environment, it is desired a facial recognition apparatus to contribute to decreasing false recognition.

Figure 1B:
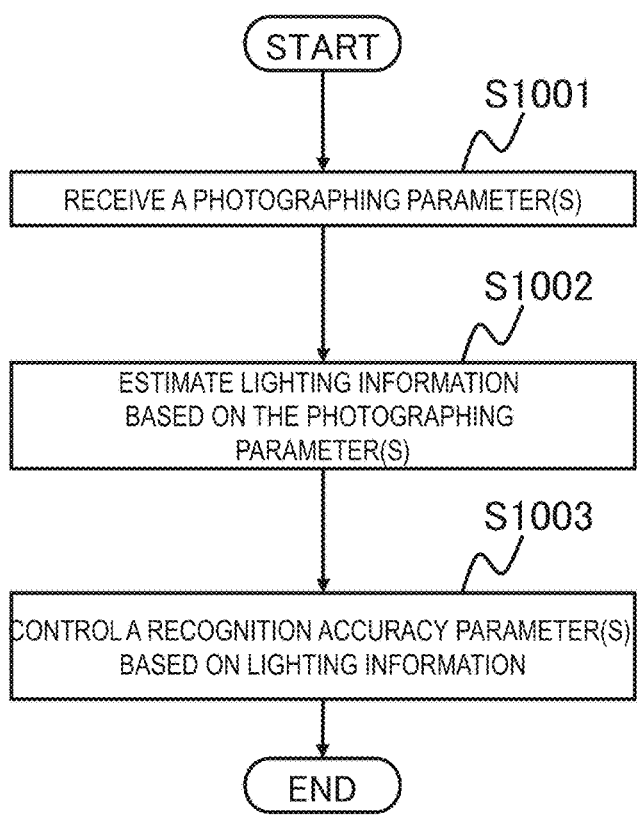

A facial recognition apparatus 100 shown in FIG. 1A and FIG. 1B are provided as an example. A facial recognition apparatus 100 comprises a photographing parameter input unit 101 that receives a photographing (imaging) parameter(s); a lighting information estimation unit 102 that estimates lighting information based on the photographing parameter(s); and a recognition accuracy control unit 103 that controls a recognition accuracy parameter(s) based on the lighting information.

The facial recognition apparatus 100 receives a photographing parameter(s) (step S1001). The photographing (imaging) parameter(s) means a parameter(s) that is set as a photographing (imaging) condition when a photographing (imaging) apparatus (camera) captures an image of a target. Especially, it is preferred that the photographing parameter(s) includes a parameter(s) relating to a gain, exposure time, a diaphragm, a brightness of a target, etc. And, the facial recognition apparatus 100 estimates the lighting information based on the photographing parameter(s) (step S1002). The lighting information means information that indicates brightness at target's neighborhood (a lighting environment). And, the facial recognition apparatus 100 controls the recognition accuracy parameter(s) based on the lighting information (step S1003). Therefore, the facial recognition apparatus minimizes that recognition accuracy decreases depending on the lighting information when a facial recognition is performed. Hence, the facial recognition apparatus 100 contributes to decreasing false recognition depending on the lighting information.

Concrete exemplary embodiments will be described below in more detail with reference to the drawings.

Exemplary Embodiment 1

An exemplary embodiment 1 will be described in more detail with reference to the drawings.

Figure 2:
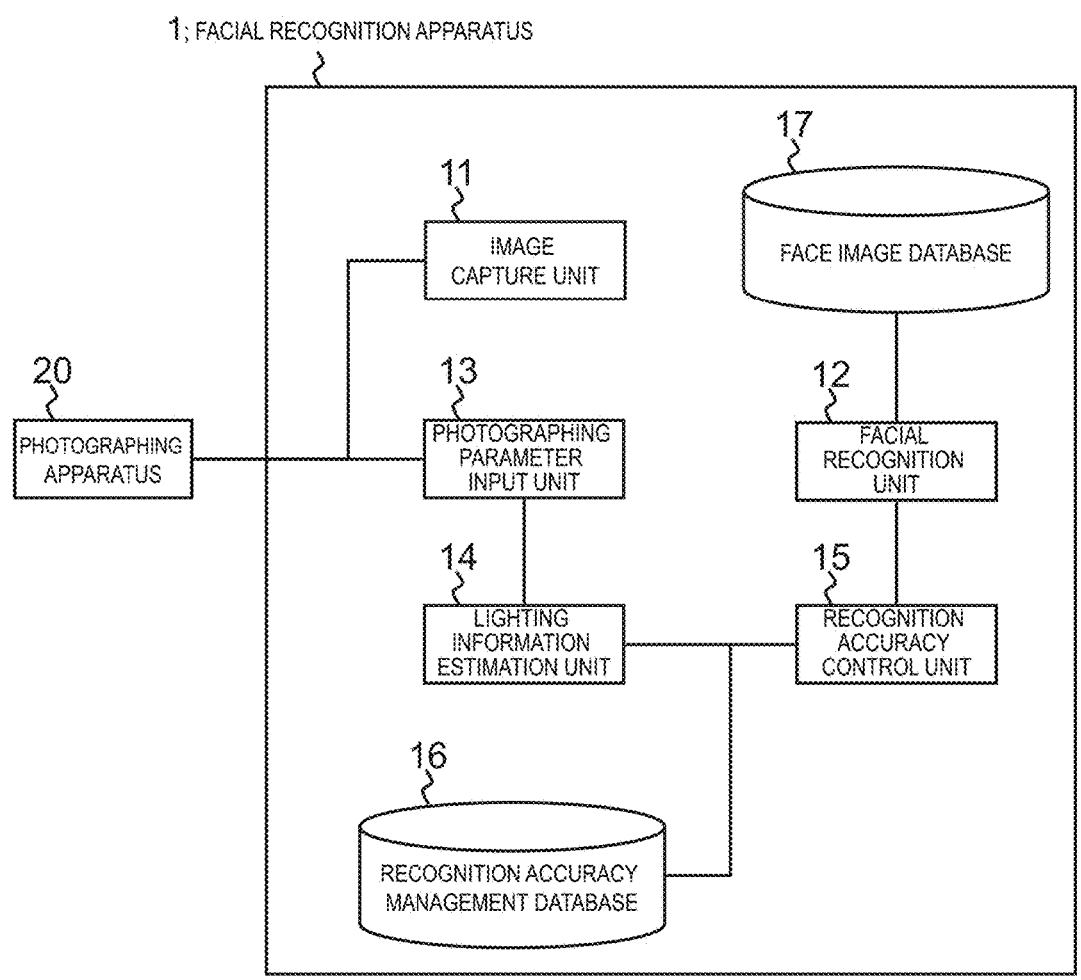
FIG. 2 is a block diagram of an example of an internal configuration of a facial recognition apparatus 1 relating to an exemplary embodiment 1.

FIG. 2 is a block diagram of an example of an internal configuration of a facial recognition 1 of the present exemplary embodiment. The facial recognition apparatus comprises an image capture unit 11, a facial recognition unit 12, a photographing parameter input unit 13, a lighting information estimation unit 14, a recognition accuracy control unit 15, a recognition accuracy management database 16, and face image database 17. And, the facial recognition apparatus 1 is connected with a photographing apparatus 20. For simplicity, FIG. 2 only shows modules relevant to the facial recognition apparatus 1 relating to the present exemplary embodiment.

First, the facial recognition apparatus will be described in detail.

The photographing apparatus 20 captures an image of a target. Concretely, the photographing apparatus 20 captures an image of a target based on a predetermined photographing parameter(s).

Figure 3:
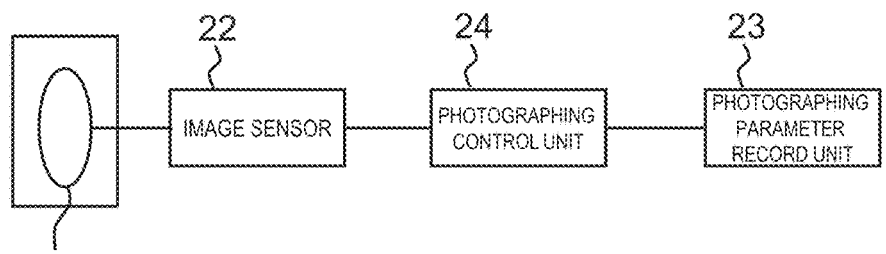
FIG. 3 is a block diagram of an example of an internal configuration of a photographing apparatus 20 relating to the exemplary embodiment 1.

FIG. 3 is a block diagram of an example of an internal configuration of the photographing apparatus 20. The photographing apparatus 20 comprises a photographing lens 21, an image sensor 22, a photographing parameter record unit 23, and a photographing control unit 24. For simplicity, FIG. 3 only shows modules relevant to the photographing apparatus 20 relating to the present exemplary embodiment.

The photographing lens 21 is configured with a plurality of optical systems including a zoom lens and a focus lens. For simplicity, FIG. 3 shows the photographing lens 21 as a single lens.

For example, the image sensor 22 is configured with a CCD (Charge Coupled Device), a CMOS (Complementary Metal Oxide Semiconductor), etc. A light signal collected by the photographing lens 21 makes an image on a surface of the image sensor 22 that receives light. And, the image sensor 22 transforms the received light signal to an electric signal (an analog signal).

The photographing parameter record unit 23 records a photographing parameter(s). Concretely, the photographing parameter record unit 23 records the photographing parameter(s) such as a gain, exposure time, a diaphragm, a brightness of a target, etc.

The photographing control unit 24 controls the whole of the photographing apparatus 20, and each module shown in FIG. 3. Concretely, the photographing control unit 24 controls a process of photographing based on the photographing parameter(s). Further, the photographing control unit 24 can be embodied by a computer program causing a computer mounted on the photographing apparatus 20 to execute processes of the photographing apparatus 20 using the hardware of the computer.

Next, the facial recognition apparatus 1 will be described in detail.

The face image database 17 records a face image(es) of one or more person. Further, the face image database 17 may record the face image with a plurality of face angles for each person. Note that, in the following description, an image registered in the face image database 17 is referred to as a template image. And, the face image database 17 may extract a feature point(s) from a template image in advance, and record them.

The image capture unit 11 captures an image that the photographing apparatus 20 captures. Note that, in the following description, an image that the photographing apparatus 20 captures is referred to as a recognition target image. It is preferred that the recognition target image includes a face region.

The facial recognition unit 12 collates a recognition target image with a template image, and recognizes. Concretely, the facial recognition unit 12 extracts a feature point(s) from the recognition target image and the template image. For example, it is preferred that the facial recognition unit 12 extracts an edge point(s) of eyes, a mouse, a nose, etc. as the feature point(s). Further, there are various methods for recognizing a feature point(s) of a face and the face, any method for recognizing them can be used.

The photographing parameter unit 13 receives the photographing parameter(s). Concretely, the photographing parameter input unit 13 refers to the photographing parameter record unit 23, and obtains the photographing parameter(s). Namely, the photographing parameter input unit 13 obtains the photographing parameter(s) such as a gain, exposure time, a diaphragm, etc. used when the photographing apparatus 20 has captured an image of a face.

The lighting information estimation unit 14 estimates the lighting information based on the photographing parameter(s). For example, the lighting information estimation unit 14 may estimate an illuminance (unit: lx, lux) based on the photographing parameter(s).

For example, the lighting information estimation unit 14 may estimate the illuminance based in the following equation (1). Further, this does not aim to limit a method of estimation of the illuminance to the equation (1).

[Equation 1]

$$E = \frac{\gamma \times F^2 \times (1+M)^2}{T \times ISO} \quad (1)$$

E: Illuminance
F: Diaphragm
M: Magnification
T: Exposure Time
ISO: Sensitivity
γ: Constant Further, γ is different according to an image sensor. For example, γ may range from 200 to 235.

The recognition accuracy control unit 15 controls a recognition accuracy parameter(s) based on the lighting information. Namely, the recognition accuracy control unit 15 controls a recognition accuracy based on relationship between lighting information and the recognition accuracy parameter(s). Here, the recognition accuracy control parameter(s) means a parameter(s) that influences recognition accuracy. In the following description, note that a rate to accept a wrong person in fail is referred to as a FAR (False Acceptance Rate). And, note that a rate to reject a correct person is referred to as a FRR (False Rejection Rate). It is preferable for FAR and FRR to decrease as the recognition accuracy increases.

In the following, it shows an example of the recognition accuracy control parameter(s). But, the following explanation does not aim to limit the recognition accuracy control parameter(s) to the following example.

For example, the recognition accuracy control parameter(s) may be the number of the feature points to be used for facial recognition. Namely, the recognition accuracy control unit 15 may control the number of the feature points to be used for facial recognition based on the lighting information. Here, the recognition accuracy may increase as the number of feature points increase. Therefore, the recognition accuracy control unit 15 can control the recognition accuracy by changing the number of feature points.

And, the recognition accuracy control parameter(s) may a weight(s) for the feature point(s). Namely, the recognition accuracy control unit 15 may control the weight(s) for the feature point(s) based on the lighting information. In this case, it is preferred that the recognition accuracy control unit 15 changes the weight(s) for the feature point(s) based on similarities between the feature point(s) of a template image and the feature point(s) of a recognition target image. As the feature points with low similarity increase, the possibility of false recognition increases. Therefore, the recognition accuracy control unit 15 can control the recognition accuracy by changing the weight(s) for the feature points.

And, the recognition accuracy control parameter(s) may be a threshold of an evaluation value. Namely, when the facial recognition unit 12 determines a result by whether or not an evaluation value is more than a predetermined threshold, the recognition accuracy control unit 15 may control the threshold of the evaluation value based on the lighting information. It is preferred that the evaluation value is a calculated value based on similarities of each feature point. In this case, as the threshold of the evaluation value increases, the possibility of false recognition decreases. Therefore, the recognition accuracy control unit 15 can control by changing the threshold of the evaluation value.

For example, regarding the each feature point, the facial recognition unit 12 calculates similarities between the recognition target image and the template images. And, the facial recognition unit 12 may set the accumulated value of the calculated similarities as the evaluation value. There are various calculation methods of the evaluation value, but any calculation method of the evaluation value can be used.

And, for each person, the face image database 17 may record his/her face images with a plurality of face angles. In this case, the recognition accuracy control unit 15 may control a number of patterns of face angles of template images. By changing the face angles of the template images, the difference from other person sometimes becomes clear. Therefore, the recognition accuracy control unit 15 can control the recognition accuracy by changing the number of the patterns of face angles of the template images.

The recognition accuracy management database 16 stores the lighting information and the recognition accuracy parameter(s) in association. For example, the recognition accuracy management database 16 may store an illuminance in a predetermined range and a predetermined recognition accuracy parameter(s) in association. Namely, the recognition accuracy management database 16 may record a table associated the lighting information with the recognition accuracy (including FAR, FRR, etc.). Or, the recognition accuracy management database 16 may record a function associated the lighting information with the recognition accuracy.

The recognition accuracy management database 16 may record a relationship between the lighting information and the recognition accuracy control parameter(s). For example, the recognition accuracy management database 16 may record a relationship between the lighting information and a number of the feature points. The recognition accuracy management database 16 may record a relationship between the lighting information and a weight(s) for the feature point(s). The recognition accuracy management database 16 may record a relationship between the lighting information and a threshold(s) of the evaluation values. The recognition accuracy management database 16 may record a relationship between the lighting information and a FAR. Further, in this case, it is preferred the recognition accuracy management database 16 records the number of the feature points, the thresholds(s) of the evaluation values, etc. associating with a FAR.

FIG. 4 is a drawing of an example of a table of showing a relationship between an illuminance and a FAR. For example, when a face is recognized indoors without light, it may be difficult for the facial recognition 12 to extract the feature point(s). Namely, when a face is recognized indoors without light, it is possible that the facial recognition unit 12 cannot recognize a face correctly.

Therefore, when a face is recognized indoors without light, it is preferred that the recognition accuracy control unit 15 sets the recognition accuracy to be lower than when a face is recognized indoors with light. Concretely, it is preferred that the recognition accuracy control unit 15 controls the recognition accuracy control parameter(s) such that a FAR is higher, when a face is recognized indoors without light. Namely, it is preferred that controls the recognition accuracy control parameter(s) such that a recognition accuracy is lower (a FAR is higher), when a face is recognized indoors without light.

On the other hand, it is possible that the facial recognition unit 12 can extract the feature point(s) easily, when a face is recognized in a cloudy outdoor environment. However, it is possible that the facial recognition unit 12 recognize a wrong person in fault, when a face is recognized in the cloudy outdoor environment. Namely, it is assumed that it tends that a FAR is higher, when a face is recognized in the cloudy outdoor environment.

Therefore, as shown in FIG. 4, in the case where a face is recognized in the cloudy outdoor environment, it is preferred that the recognition accuracy control unit 15 makes a FAR be lower than when a face is recognized outdoors with backlight and direct light. Concretely, in the case where a face is recognized in the cloudy outdoor environment, it is preferred that the recognition accuracy control unit 15 controls the recognition accuracy control parameter(s), such that a FAR is lower.

Figure 5:
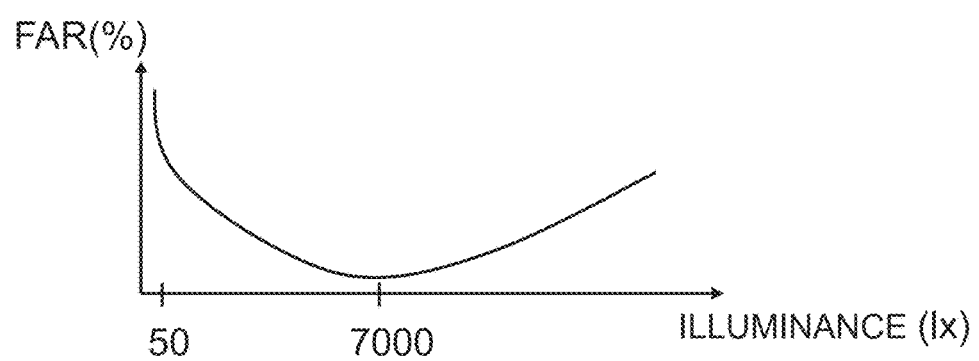
FIG. 5 is a drawing of an example of a function of showing a relationship between the illuminance and FAR.

FIG. 5 is a drawing of an example of a function of showing a relationship between an illuminance and a FAR. As shown in FIG. 5, the recognition accuracy management database 16 may record the relationship between the illuminance and the FAR such that the FAR changes continuously, according to the illuminance.

Next, an operation of the facial recognition apparatus 1 relating to the present exemplary embodiment will be described.

Figure 6:
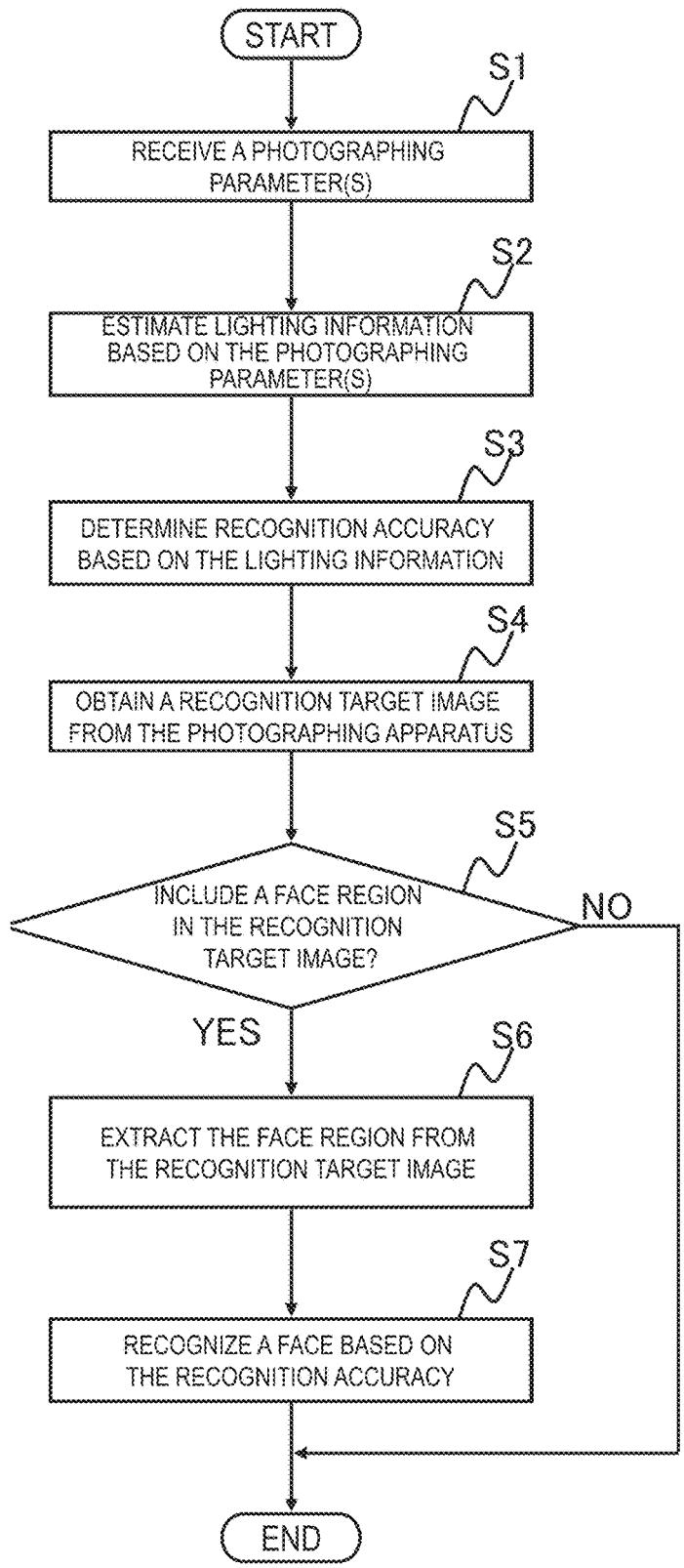
FIG. 6 is a flowchart of an example of processes of controlling the recognition accuracy.

FIG. 6 is a flowchart of an example of processes of controlling the recognition accuracy.

In step S1, the photographing parameter input unit 13 receives the photographing parameter(s). Concretely, it is preferred that the photographing parameter input unit 13 obtains the photographing parameter(s) form the photographing apparatus 20.

In step S2, the lighting information estimates the lighting information based on the photographing parameter(s).

In step S3, the recognition accuracy control unit 15 determines the recognition accuracy based on the lighting information.

Concretely, the recognition accuracy control unit 15 refers to the recognition accuracy management database 16, and determines the recognition accuracy parameter(s) based on the lighting information.

In step S4, the image capture unit 11 obtains the recognition target image form the photographing apparatus 20. And, the facial recognition unit 12 determines whether or not a face region is included in the recognition target image. For example, the facial recognition unit 12 detects feature points of eyes (for example, edge points of eyes, etc.) from the recognition target image. And, the facial recognition unit 12 may determine that the face region is included in the recognition target image, when the feature points of eyes are detected.

When the face region is included in the recognition target image (Yes in the step S5), the facial recognition unit 12 extracts the face region from the recognition target image (step S6). For example, the facial recognition unit 12 may extract the face region based on the positions of eyes. On the other hand, when the face region is not included in the recognition target image (No in the step S5), the process of controlling the recognition accuracy will finish.

In step S7, the facial recognition unit 12 recognizes a face based on the recognition accuracy. Concretely, the facial recognition unit 12 sets the recognition accuracy parameter(s) based on the recognition accuracy. And, the facial recognition unit 12 may recognize a face using the recognition accuracy parameter(s) that is set.

Further, the recognition accuracy control unit 15 may control the recognition accuracy parameter(s) based on the photographing parameter(s). Namely, the recognition accuracy control unit 15 may control the recognition accuracy based on the relationship between the photographing parameter(s) and the recognition accuracy parameter(s). And, the recognition accuracy management database 16 may record the relationship between the photographing parameter(s) and the recognition accuracy control parameter(s).

For example, the recognition accuracy control unit 15 may control a number of the feature points used for recognition based on the photographing parameter(s). Or, the recognition accuracy control unit 15 may control a weight(s) for the feature point(s) based on the photographing parameter(s). Or the recognition accuracy control unit 15 may control a number of patterns of face angles of the template images.

[Modification 1]

As a modification 1 relating to the exemplary embodiment 1, an apparatus that is (in the following, the apparatus is referred to as a server apparatus) different from the facial recognition may comprise the facial recognition unit 12 and the face image database 17. Because, in the facial recognition unit 12, a load of the process of the recognizing changes depending on a number of the template images. Therefore, the server apparatus that has higher performance that the facial recognition apparatus 1 may comprise the facial recognition unit 12 and the face image database 17. Further, in this case, the facial recognition 1 and the server apparatus may control via a network.

[Modification 2]

As a modification 2 relating the exemplary embodiment 1, the photographing apparatus 20 may comprises the illuminance sensor. In this case, the photographing parameter input unit receives an output value of the illuminance sensor as the photographing parameter. And, the illuminance information estimation unit 14 may estimate the illuminance information based on the output value of the illuminance sensor.

A first effect of the facial recognition apparatus relating to the present exemplary embodiment is to decrease false recognition. For example, when a face is recognized in an environment such as indoor without light etc., it may be false recognition. However, the facial recognition apparatus 1 relating to the present exemplary embodiment controls the recognition accuracy based on the illuminance information such as to decrease the false recognition. Therefore, the facial recognition apparatus 1 relating to the exemplary embodiment contributes to decreasing false recognition depending on the lighting information.

A second effect of the facial recognition apparatus 1 relating to the present exemplary embodiment is to decrease a user's load for the facial recognition. In the technique disclosed in Patent Literature 1, when the facial recognition has been failed, it is necessary to capture an image again. However, the facial recognition apparatus 1 relating to the present exemplary embodiment controls the recognition accuracy to decrease a possibility of false recognition. Therefore, the facial recognition apparatus 1 relating to the present exemplary embodiment does not need to capture a face image repeatedly. Hence, the facial recognition apparatus 1 relating to the present exemplary embodiment contributes to decreasing user's load.

Exemplary Embodiment 2

In the followings, the exemplary embodiment 2 will be described in more detail with reference to the drawings.

The present exemplary embodiment is an embodiment where an information device comprises a facial recognition apparatus. Note that the description that overlaps with the exemplary embodiment described above will be omitted in the description of the present exemplary embodiment. Further, the same signs are given to the elements same as those in the exemplary embodiment described above and the explanation thereof will be omitted in the description of the present exemplary embodiment.

Figure 7:
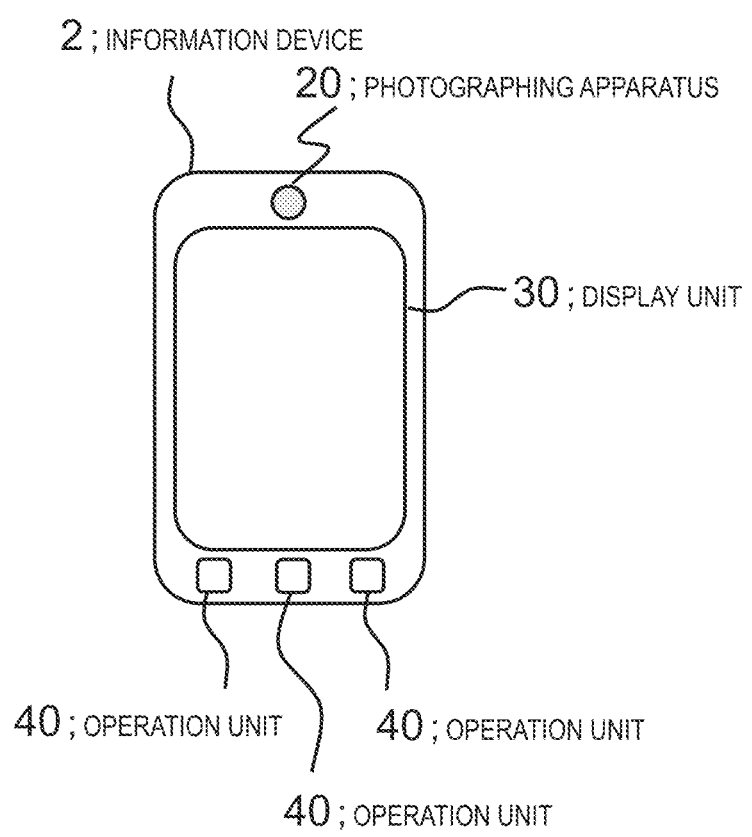
FIG. 7 is a plan image of an example of showing the overall configuration of an information device 2 relating to an exemplary embodiment 2.

FIG. 7 is a plan image of an example of showing the overall configuration of an information device 2 relating to the present exemplary embodiment. The information device 2 comprises the photographing apparatus 20, a display apparatus 30 and an operation unit 40. Note that, FIG. 7 does not aim to limit the information device 2 relating to the present apparatus to an embodiment shown in FIG. 7. For example, the information device 2 may be an information device such as a smartphone, a mobile telephone, a game device, a tablet PC (Personal Computer), a note PC, a PDA (Personal Data Assistants), a digital camera, etc.

The photographing apparatus 20 can capture an image of a user's face that is facing to the display unit 30. The photographing apparatus 20 may have feature as an in-camera of the information device 2.

By the display unit, a user visually recognizes information (characters, pictures, etc.) that the information device 2 shows. As the display unit 30, a liquid crystal panel, an electro luminescence panel, etc. may be used.

The operation unit 40 receives user's operation for the information device 2. While FIG. 7 shows hardware keys as the operation unit 40, an operation means such as a touch panel, etc. may be adopted.

Figure 8:
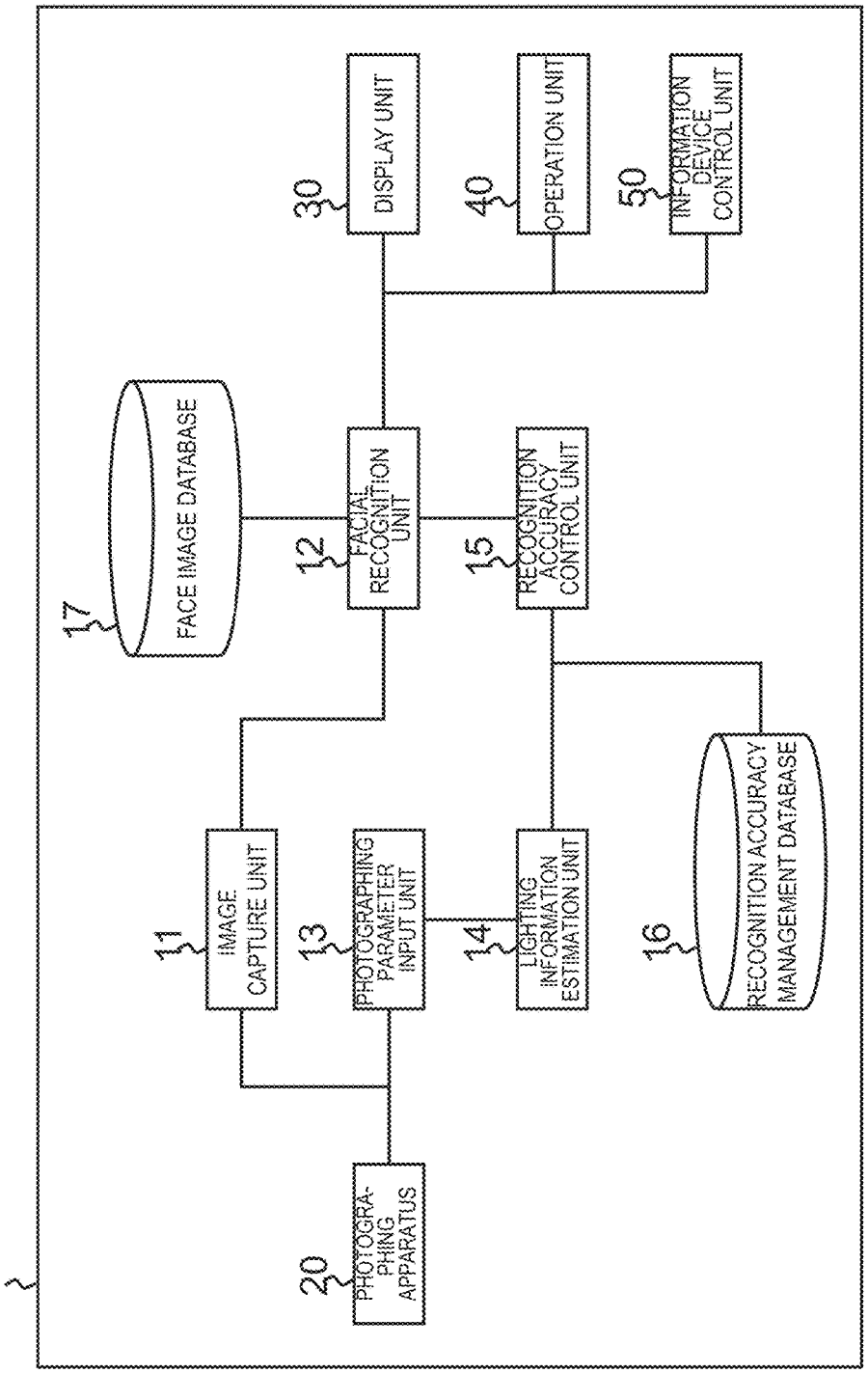
FIG. 8 is a block diagram of an example of an internal configuration of the information device 2 relating to the present exemplary embodiment

FIG. 8 is a block diagram of an example of an internal configuration of the information device 2 relating to the present exemplary embodiment. The information device 2 comprises the image capture unit 11, the facial recognition unit 12, the photographing parameter input unit 13, the lighting information estimation unit 14, the recognition accuracy control unit 15, the recognition accuracy management database 16, the face image database 17, the photographing apparatus 20, the display unit 30, the operation unit 40, and an information device control unit 50. Namely, the information device 2 comprises the facial recognition apparatus 1. Note that, for simplicity, FIG. 8 only shows modules relevant to the information device 2 relating to the present exemplary embodiment.

The information device control unit 50 controls the whole of the information device 2, and modules shown in FIG. 7. The information device control unit 50 can be embodied by a computer program causing a computer mounted on the information device 2 to execute processes of the information device 2 using the hardware of the computer.

For example, the information device control unit 50 may display on the display unit 30 a result of recognition by the facial recognition unit 12. And, based on the operation to the operation unit 40, the information device control unit 50 may determine whether or not the facial recognition unit 12 starts a facial recognition. Alternatively, based on the result of the recognition by the facial recognition unit 12, the information device control unit 50 may determine whether or not the user's operation to the operation unit 40 is accepted.

As described above, the information device 2 relating to the present exemplary embodiment comprises functions of the facial recognition apparatus 1. And, the information device relating to the exemplary embodiment controls processes to be executed based on a result of recognition of a face. Namely, the information device relating to the present exemplary embodiment comprises functions for high security. Therefore, the information device 2 relating to the present exemplary embodiment contributes to decreasing false recognition, and providing functions for high security.

Exemplary Embodiment 3

In the following, the exemplary embodiment 3 will be described in more detail.

The present exemplary embodiment is an embodiment of an information device that executes an application that has a facial recognition function. Note that the description that overlaps with the exemplary embodiment describe above will be omitted in the description of the present exemplary embodiment. Further, the same signs are given to the elements same as those in the exemplary embodiment described above and the explanation thereof will be omitted in the description of the present exemplary embodiment.

The information device 2 relating to the present exemplary embodiment controls applications. And, the information device control unit 50 controls the application that has a facial recognition function, based on a result of facial recognition.

For example, the application that has a facial recognition function may execute an application that resets a screen lock, when a face is recognized. Here, the screen lock means a state where a user's operation to the operation unit 40 cannot be accepted. Further, there are various applications that have the facial recognition function, but any application that has the facial recognition function can be used.

[Modification 1]

As a modification 1 of the information device 2 relating to the present exemplary embodiment, recognition accuracy may change according to the application. For example, let's assume that the information device 2 mounts an alarm application and an electronic money management application as the application that has the facial recognition function. In this case, the recognition accuracy control unit 15 may set the recognition accuracy to be higher for the electronic money management application than that for the alarm application.

As described above, the information device 2 relating to the present exemplary embodiment mounts the application that has the facial recognition function. And, when a face is recognized, the information device 2 relating to the present exemplary embodiment allows that a user uses the application. Therefore, the information device 2 relating to the present exemplary embodiment contributes more to providing functions for high security.

A part of/a whole of the above exemplary embodiment can be described as the following modes, but not limited to the following modes.

(Mode 1)
As the facial recognition apparatus relating to the first aspect.

(Mode 2)
The facial recognition apparatus according to Mode 1, wherein the recognition accuracy control unit controls a threshold to determine a result of recognition based on the lighting information.

(Mode 3)
The facial recognition apparatus according to Mode 1 or 2, wherein the recognition accuracy control unit controls a feature point(s) to be collated, based on the lighting information.

(Mode 4)
The facial recognition apparatus according to Mode 3, wherein the recognition accuracy control unit controls a weight(s) for the feature point(s) based on the lighting information.

(Mode 5)
The facial recognition apparatus according to any one of Modes 1 to 4, comprising a recognition accuracy management database that stores the lighting information and the recognition accuracy parameter(s) in association.

(Mode 6)
The facial recognition apparatus according to any one of Modes 1 to 5, wherein the recognition accuracy control unit controls the recognition accuracy parameter(s) based on the photographing parameter(s) instead of the lighting information.

(Mode 7)
An information device, comprising the facial recognition apparatus according to any one of Modes 1 to 6.

(Mode 8)
The information device according to Mode 7, wherein the information device executes an application that has a facial recognition function.

(Mode 9)
As the recognition method relating to the second aspect.

(Mode 10)
The recognition method according to Mode 9, controlling a threshold to determine a result of recognition based on the lighting information.

(Mode 11)
The recognition method according to Mode 9 or 10, controlling a feature point(s) to be collated, based on the lighting information.

(Mode 12)
The recognition method according to Mode 11, controlling a weight(s) for a feature point(s) based on the lighting information.

(Mode 13)
The recognition method according to any one of Modes 9 to 12, controlling the recognition accuracy parameter(s) based on the photographing parameter(s) instead of the lighting information.

(Mode 14)
As the program relating to the third aspect.

(Mode 15)
The program according to Mode 14, controlling a threshold to determine a result of recognition based on the lighting information.

(Mode 16)
The program according to Mode 14 or 15, controlling a feature point(s) to be collated, based on the lighting information.

(Mode 17)
The program according to Mode 16, controlling a weight(s) for the feature point(s) based on the lighting information.

(Mode 18)
The program according to any one of Modes 14 to 17, controlling the recognition accuracy parameter(s) based on the photographing parameter(s) instead of the lighting information The disclosure of the above Patent Literature is incorporated herein by reference thereto. Modifications and adjustments of the exemplary embodiments and examples are possible within the scope of the overall disclosure (including the claims) of the present invention and based on the basic technical concept of the present invention. Various combinations and selections of various disclosed elements (including each element in each claim, exemplary embodiment, example, drawing, etc.) are possible within the scope of the claims of the present invention. Namely, the present invention of course includes various variations and modifications that could be made by those skilled in the art according to the overall disclosure including the claims and the technical concept.

1, 100 facial recognition apparatus
2 information device
11 image capture unit
12 facial recognition unit
13, 101 photographing parameter input unit
14, 102 lighting information estimating unit
15, 103 recognition accuracy control unit
16 recognition accuracy management database
17 face image database
20 photographing apparatus
21 photographing lens
22 image sensor
23 photographing parameter record unit
24 photographing control unit
30 display unit
40 operation unit
50 information device control unit

The invention claimed is:

1. A facial recognition apparatus connected to a photographing apparatus that captures an image of a target, comprising:
hardware, including a processor and memory;
a photographing parameter input unit implemented at least by the hardware and that receives a photographing parameter(s), wherein the photographing parameter(s) includes a parameter(s) relating to exposure time and diaphragm, and is used upon capturing, on the photographing apparatus, the image of the target;
a lighting information estimation unit implemented at least by the hardware and that estimates, before obtaining the image of the target from the photographing apparatus, lighting information based on the photographing parameter(s);
a recognition accuracy control unit implemented at least by the hardware and that determines, before obtaining the image of the target from the photographing apparatus, a number of feature points which are used upon facial recognition, based on the lighting information; and
a recognition unit implemented at least by the hardware to cause the photographing apparatus to capture the image of the target using the photographing parameter(s), and that performs, after obtaining the image of the target from the photographing apparatus, the facial recognition of the target from the captured image using as many feature points as the determined number.

2. The facial recognition apparatus according to claim 1, comprising a recognition accuracy management database that stores the lighting information and the number of feature points which are used upon facial recognition in association, wherein
recognition accuracy control unit refers to the recognition accuracy management database to determine the number of feature points.

3. The facial recognition apparatus according to claim 1, comprising
a control unit implemented at least by the hardware to control, based on a result of the facial recognition, an application that has a facial recognition function.

4. The facial recognition apparatus according to claim 1, comprising the photographing apparatus.

5. A recognition method, comprising:
receiving a photographing parameter(s), wherein the photographing parameter(s) includes a parameter(s) relating to exposure time and diaphragm, and is used upon capturing, on a photographing apparatus, an image of a target;

estimating, before obtaining the image of the target, lighting information based on the photographing parameter(s); and determining, before obtaining the image of the target, a number of feature points which are used upon facial recognition, based on the lighting information;

obtaining the image of the target from the photographing apparatus that captures the image of the target using the photographing parameter(s); and performing, after obtaining the image of the target from the photographing apparatus, the facial recognition of the target from the captured image using as many feature points as the determined number.

6. The recognition method according to claim 5, wherein the determining comprises referring to a recognition accuracy management database that stores the lighting information and the number of feature points which are used upon facial recognition in association.

7. The recognition method according to claim 5, further comprising controlling, based on a result of the facial recognition, an application that has a facial recognition function.

8. A non-transitory computer readable recording medium storing a program that causes a computer for controlling a facial recognition apparatus to execute, wherein the facial recognition apparatus connects to a photographing apparatus that captures an image of a target:

receiving a photographing parameter(s), wherein the photographing parameter(s) includes a parameter(s) relating to exposure time and diaphragm, and is used upon capturing, on a photographing apparatus, an image of a target;

estimating, before obtaining the image of the target, lighting information based on the photographing parameter(s); and determining, before obtaining the image of the target, a number of feature points which are used upon facial recognition, based on the lighting information;

obtaining the image of the target from the photographing apparatus using the photographing parameter(s); and performing, after obtaining the image of the target from the photographing apparatus, recognition of the target from the captured image using as many feature points as the determined number.

9. The recording medium according to claim 8, wherein the determining comprises referring to a recognition accuracy management database that stores the lighting information and the number of feature points which are used upon facial recognition in association.

10. The recording medium according to claim 8, wherein the program further causes the computer to execute controlling, based on a result of the facial recognition, an application that has a facial recognition function.

* * * * *